L. HERMANCE.
Culinary Vessel.
No. 112,916.  Patented Mar. 21, 1871.
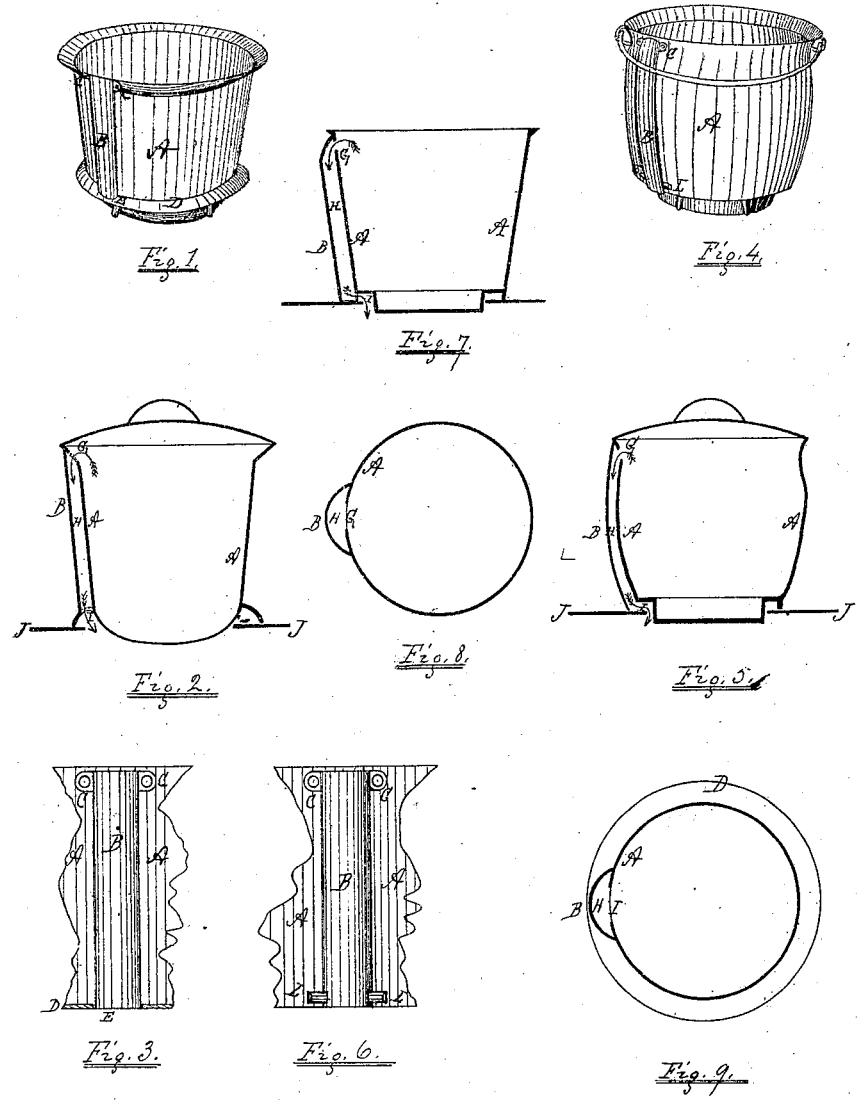

United States Patent Office.

LEVI HERMANCE, OF LANSINGBURG, NEW YORK, ASSIGNOR OF ONE-HALF HIS RIGHT TO PELETIAH J. MARSH, OF SAME PLACE.

Letters Patent No. 112,916, dated March 21, 1871.

IMPROVEMENT IN CULINARY VESSELS.

The Schedule referred to in these Letters Patent and making part of the same.

I, LEVI HERMANCE, of the village of Lansingburg, county of Rensselaer and State of New York, have invented an Improvement in Cast-iron Hollow-Ware, of which the following is a specification.

My invention consists in the construction of cast-iron hollow-ware to be used for boiling and other purposes, having in combination therewith a plate secured properly to the outside thereof, so that a flue is formed running vertically between said plate (inclosed thereby) and the side or wall of the utensil, an opening being provided leading to said flue from the interior of the utensil at the top, and an exit-opening at the bottom of said flue, through a flange at bottom of utensil, to space below, and when on the stove to the fire, as will be hereinafter more fully described. The flue thus formed is for the purpose of removing the surplus steam, and consequently disagreeable odors, to the fire, thereby keeping them from the room; and by the flue outside the utensil no obstruction is formed on the inside to create annoyance in cleaning or difficulty in casting or finishing.

Description of the Accompanying Drawing.

Figure 1 is a perspective view of a pot or kettle having the extra plate in combination.
Figure 2 is a vertical section of the same.
Figure 3 is an elevation of the extra plate.
Figure 4 is a perspective view of a pot or kettle having extra plate in combination, but connected differently, but otherwise the same.
Figure 5 is a vertical section of the same.
Figure 6 is an elevation of the extra plate of figs. 4 and 5.
Figure 7 is a vertical section of a straight-sided pot or kettle having the flue strip secured by dovetailed nibs at bottom and riveted at top; no flange at top or bottom.
Figure 8 is a horizontal section of the same; no flange.
Figure 9 is a horizontal section of fig. 7, having flange at the bottom.
Like letters refer to like or corresponding parts.

General Description.

A represents the side or wall of a pot or kettle.
B represents an extra plate, cast separately and afterward attached to said utensil.
C represents the projections at the upper end, one each side, having holes therein through which rivets pass, fastening it to the utensil.
D represents a flange at the lower part of the utensil.
E represents an aperture therein through which the lower end of the plate B passes, thereby being firmly held at that point.
G represents an aperture through the wall A of the utensil, through which steam escapes from the interior of the utensil to the flue H, formed between the plate B and the wall of the utensil A.

At I is the outlet from said flue to the space below the utensil, to permit the escape of steam and odors to the fire.

J, in figs. 2 and 5, represent portions of the stove top when the utensil is placed thereon.

In figs. 1, 2, and 3 the plate B is represented as attached to a flange at the top of the utensil, and the opening G is through said flange; and the bottom of the plate B passes, in same figs. 1, 2, and 3, downward through said flange at bottom B. This end being inserted first, the plate is then riveted at the top, being secured in that manner.

In figs. 4, 5, and 6 nibs are shown at L L, through which the bottom of the plate B is dovetailed, and thereby held at that point, and at the top riveted to the utensil similar to fig. 1, but without an extra flange.

In figs. 4, 5, and 6 the flange D at bottom descends vertically all around, a piece being left out to form an opening from the flue H to the space below the utensil.

The shape of the plate B is not material. It should correspond with the shape of the utensil, and sectionally as most suitable.

Hollow-ware pots and kettles have been constructed with tubes leading downward, inside either, close to the walls or centrally; but this is a very inconvenient style, as it is very troublesome to keep them clean.

Such ware is difficult to cast, and it is impossible to finish them by machinery in a proper manner; while in my construction the interior is left free from obstruction, thereby readily cleaned; can be machine-finished, polished, &c., without trouble and at slight expense, and the whole is cast as easily as ordinary ware.

The steam escapes readily, odors are kept from the room, and the extra expense is merely nominal.

There may be more than one flue so constructed, if required, in the same manner around the utensil; but I have found one usually to be sufficient.

What I claim, and desire to secure by Letters Patent of the United States, is—

1. The casting of the utensil A and flue-strip or plate B in separate pieces, and combining or joining them together, substantially in the manner as herein described and set forth.

2. Forming the steam-flue or flues H on the outside of a cast-iron culinary utensil by the employment of the flue-piece B, or its equivalent, when attached to the utensil A, substantially as herein set forth.

3. The projecting flange D, in combination with the kettle A and plate B, when constructed and combined substantially in the manner and for the purpose as described and set forth.

Witnesses:     LEVI HERMANCE.
  A. J. ROBINSON,
  RICHARD H. REILLE.